(No Model.)

G. M. LANE.
INSULATING PIPE JOINT.

No. 419,962.  Patented Jan. 21, 1890.

Witnesses
Inventor
George M. Lane.
Attorney

UNITED STATES PATENT OFFICE.

GEORGE M. LANE, OF ASBURY PARK, NEW JERSEY.

INSULATING PIPE-JOINT.

SPECIFICATION forming part of Letters Patent No. 419,962, dated January 21, 1890.

Application filed March 16, 1889. Serial No. 303,521. (No model.)

*To all whom it may concern:*

Be it known that I, GEORGE M. LANE, a citizen of the United States, residing at Asbury Park, in the county of Monmouth and State of New Jersey, have invented certain new and useful Improvements in Insulated Sections for Gas and Water Pipes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to an insulated section for gas, water, and other pipes.

Where electric lights are in use in combination with gas, or where the electric wires come in contact with gas or other pipes, a very annoying and dangerous element exists in the frequent "grounds" caused by the wires coming in contact with the pipes.

The object of the invention is to obviate this feature, which has so often proven disastrous to life and property, by introducing a short section of insulated pipe or connection between the mains and the house-pipes or between the house-pipes and the fixtures, so that in the event of the wires coming in contact with said pipes the current cannot make a ground-connection.

The improvement consists of the peculiar construction and the combination of the parts, which will be hereinafter more particularly described, and pointed out in the claims, and shown in the annexed drawings, in which—

Figure 1:
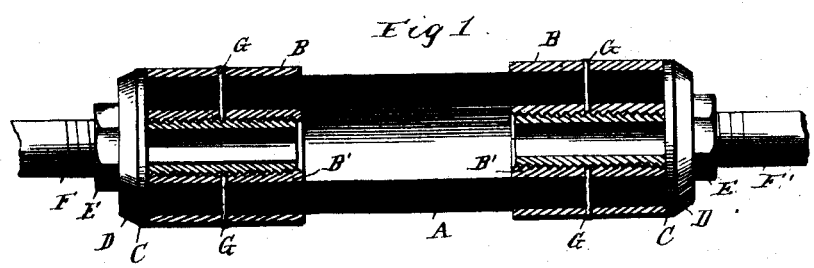
Figure 2:
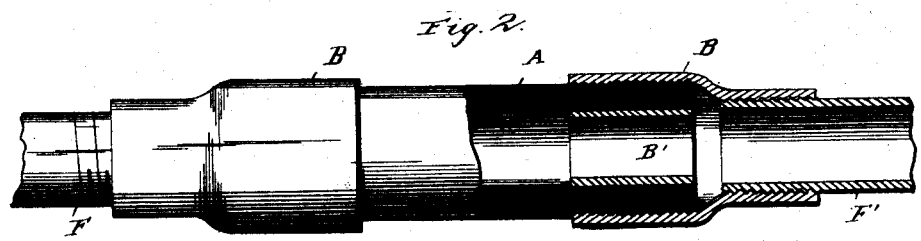

Figure 1 is a central longitudinal section of the insulating-section, showing its application; and Fig. 2, a side view, parts being broken away, of a modification.

F F' represent the ends of two pipes which are to be electrically insulated from each other and which are connected by the section A, of rubber or other insulating material. Each end of this section A is re-enforced by thimbles B and B', the thimbles B being on the outside and the thimbles B' on the inside of the said section A, which is tightly embraced between the said thimbles, which latter are secured thereto in any desired manner, preferably by the rivets G. The thimbles B' are internally threaded to screw on the threaded ends of the pipes F and F'. The flexible washers C and the metal washers D are interposed between the nuts E and the ends of the insulating-section A. By turning the nut E the washer C, which is placed between the end of the section A and the washer D, will be pressed close against the end of the said section A and prevent any possible escape of gas or other substance from the joint between the pipes and the said section.

Fig. 1 shows the preferred form of construction. However, I do not wish to restrict myself to the same, as it is obvious that the thread may be cut on the outside of the insulating-section, as shown in Fig. 2.

Having thus described my invention, what I claim, and desire to secure by Letters Patent, is—

1. The hereinbefore-specified electrically-insulating joint or coupling for pipes, comprising an insulating tubular section A and inner and outer metal thimbles secured to the ends of the said section A, one of the said thimbles being threaded and adapted to receive the ends of the pipe to be coupled, substantially as described.

2. The hereinbefore-specified electrically-insulating pipe joint or coupling, composed of an insulating tubular section A, the inner and outer thimbles B' and B at the ends of said section A, the inner thimbles B' being internally threaded, and the rivets G, passing through the two thimbles and the insulating-section, substantially as and for the purpose described.

3. The combination, with the insulating pipe-joint comprising the insulating tubular section A and the metal thimbles at each end of said section A, the inner thimbles being internally threaded and the pipes screwed into the ends of said joint, of the insulating-washers C, metal washers D, and the binding-nuts E, mounted on said pipes, the insulating-washers C being between the ends of the joint and the washers D and the nuts E clamping washers C against the ends of the said joint, substantially as described.

In testimony whereof I affix my signature in presence of two witnesses.

GEORGE M. LANE.

Witnesses:
JOHN ROCKAFELLER,
J. C. BERRANG.